United States Patent
Metcalf, II et al.

(10) Patent No.: US 12,437,082 B2
(45) Date of Patent: Oct. 7, 2025

(54) SYSTEM AND METHOD FOR AUTOMATED EXPLOITATION GENERATION

(71) Applicant: Booz Allen Hamilton Inc., McLean, VA (US)

(72) Inventors: Leander A. Metcalf, II, Millersville, MD (US); Allen Stewart, Atlanta, GA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 18/790,022

(22) Filed: Jul. 31, 2024

(65) Prior Publication Data

US 2025/0045418 A1    Feb. 6, 2025

Related U.S. Application Data

(60) Provisional application No. 63/516,661, filed on Jul. 31, 2023.

(51) Int. Cl.
G06F 21/57    (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,296,848 B1* | 10/2012 | Griffin | G06F 21/52 717/124 |
| 2006/0277539 A1* | 12/2006 | Amarasinghe | G06F 21/54 717/168 |
| 2008/0098479 A1* | 4/2008 | O'Rourke | H04L 63/1433 726/25 |

(Continued)

OTHER PUBLICATIONS

International Search Report and Written Opinion of the International Searching Authority (Forms PCT/ISA/220, PCT/ISA/210 and PCT/ISA/237) issued on Jun. 16, 2025, by the International Bureau of the U.S. Patent and Trademark Office in corresponding International Application No. PCT/US2024/040341. (8 pages).

*Primary Examiner* — Fatoumata Traore
(74) *Attorney, Agent, or Firm* — Buchanan Ingersoll & Rooney PC

(57) ABSTRACT

Embodiments can relate to a system for automated exploit generation that receives input data representative of a target action to establish a target having a potential target vulnerability. The system can build a simulated target environment that includes the established target. The system can conduct an analysis method including a static, a concrete, a dynamic, and/or a symbolic analysis. The system can create a chainable sequence including an information disclosure, a read, a write, and/or an execution exploit primitive. The system can generate an exploit chain that, when executed by the processor in response to the target action, can transform the target action to a target failure within the simulated target environment and thereby expose the target vulnerability. The system can execute the exploit chain within the simulated target environment to examine coverage of the exposed target vulnerability. The system can generate an output representative of the exposed target vulnerability.

16 Claims, 12 Drawing Sheets

(56) References Cited

U.S. PATENT DOCUMENTS

| | | | | |
|---|---|---|---|---|
| 2010/0138925 A1* | 6/2010 | Barai | .................. | H04L 63/1433 |
| | | | | 726/25 |
| 2015/0326592 A1* | 11/2015 | Vissamsetty | ........ | H04L 63/1491 |
| | | | | 726/24 |
| 2019/0238583 A1* | 8/2019 | Vaidya | .................. | H04L 41/145 |
| 2022/0232033 A1* | 7/2022 | Vaidya | .................... | G06F 30/20 |
| 2022/0377102 A1* | 11/2022 | Sharma | ............... | H04L 63/1433 |
| 2023/0222223 A1* | 7/2023 | Lahmadi | ............. | H04L 63/1433 |
| | | | | 726/25 |

* cited by examiner

Exemplary Process Flow
1. Generate analysis artifacts
2. Generate ROP gadgets
3. Replicate the crash and save the program state
4. Symbolically trace the program
5. Determine exploitability
6. Check for technique application
7. Symbolically solve for exploit chains
8. Generate exploit based on template

SYSTEM AND METHOD FOR AUTOMATED EXPLOITATION GENERATION

CROSS-REFERENCE TO RELATED APPLICATIONS

This patent application is related to and claims the benefit of priority to U.S. Provisional Patent Application No. 63/516,661, filed on Jul. 31, 2023, the entire contents being incorporated herein by reference.

FIELD

Embodiments can relate to systems and methods for generating an exploit chain that, when executed in response to a target action, transforms the target action to a target failure within a simulated environment, thereby exposing a target vulnerability of a target.

BACKGROUND INFORMATION

Security research generally spans across multiple domains, all of which tend to require a specific set of skills and level of effort from subject matter experts and/or different or disparate analytic tools and techniques (e.g., Automated Vulnerability Research (AVR), Exploit Development (ED), Artificial Intelligence (AI), Machine Learning (ML), Vulnerability Analysis (VA), etc.). With existing methods, these different and disparate tools and techniques typically have to be implemented in some orchestrated way to effectively cover the full range of security research. This can be time consuming, burdensome, require large amounts of computational resources, etc. These setbacks can be exacerbated in the area of cyber security where the evolution of cyber-attacks is fast-paced and the effects of a cyber-attack can quickly cause widespread damage.

SUMMARY

An exemplary embodiment can relate to a system for automated exploit generation. The system can include a processor. The system can include a memory associated with the processor having instructions stored thereon that when executed can cause the processor to perform one or more of the operations disclosed herein. Instructions can cause the processor to receive input data representative of a target action to establish a target having a potential target vulnerability. Instructions can cause the processor to build a simulated or emulated target environment that includes the established target. Instructions can cause the processor to conduct an analysis method including one or more of a static, a concrete, a dynamic, or a symbolic analysis. Instructions can cause the processor to create a chainable sequence including one or more of an information disclosure, a read, a write, or an execution exploit primitive. Instructions can cause the processor to generate an exploit chain that, when executed by the processor in response to the target action, can transform the target action to a target failure within the simulated or emulated target environment and thereby expose the target vulnerability. Instructions can cause the processor to execute the exploit chain within the simulated or emulated target environment to examine coverage of the exposed target vulnerability. Instructions can cause the processor to generate an output representative of the exposed target vulnerability.

An exemplary embodiment can relate to a computer readable medium having instructions thereon that when executed by a processor can cause the processor to perform one or more of the operations disclosed herein. Instructions can cause the processor to receive input data representative of a target action to establish a target having a potential target vulnerability. Instructions can cause the processor to build a simulated or emulated target environment that includes the established target. Instructions can cause the processor to conduct an analysis method including one or more of a static, a concrete, a dynamic, or a symbolic analysis. Instructions can cause the processor to create a chainable sequence including one or more of an information disclosure, a read, a write, or an execution exploit primitive. Instructions can cause the processor to generate an exploit chain that, when executed by a processor in response to the target action, can transform the target action to a target failure within the simulated or emulated target environment and thereby expose the target vulnerability. Instructions can cause the processor to execute the exploit chain within the simulated or emulated target environment to examine coverage of the exposed target vulnerability. Instructions can cause the processor to generate an output representative of the exposed target vulnerability.

An exemplary embodiment can relate to a method for automated exploit generation. The method can involve receiving input data representative of a target action to establish a target having a potential target vulnerability. The method can involve building a simulated target environment that includes the established target. The method can involve conducting an analysis method including one or more of a static, a concrete, a dynamic, or a symbolic analysis. The method can involve create a chainable sequence including one or more of an information disclosure, a read, a write, or an execution exploit primitive. The method can involve generating an exploit chain that, when executed by a processor in response to the target action, can transform the target action to a target failure within the simulated or emulated target environment and thereby expose the target vulnerability. The method can involve executing the exploit chain within the simulated or emulated target environment to examine coverage of the exposed target vulnerability. The method can involve generating an output representative of the exposed target vulnerability.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein.

DETAILED DESCRIPTION

Figure 1:
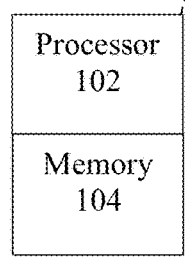
FIG. 1 shows an exemplary system for automated exploit generation.
Figure 1:
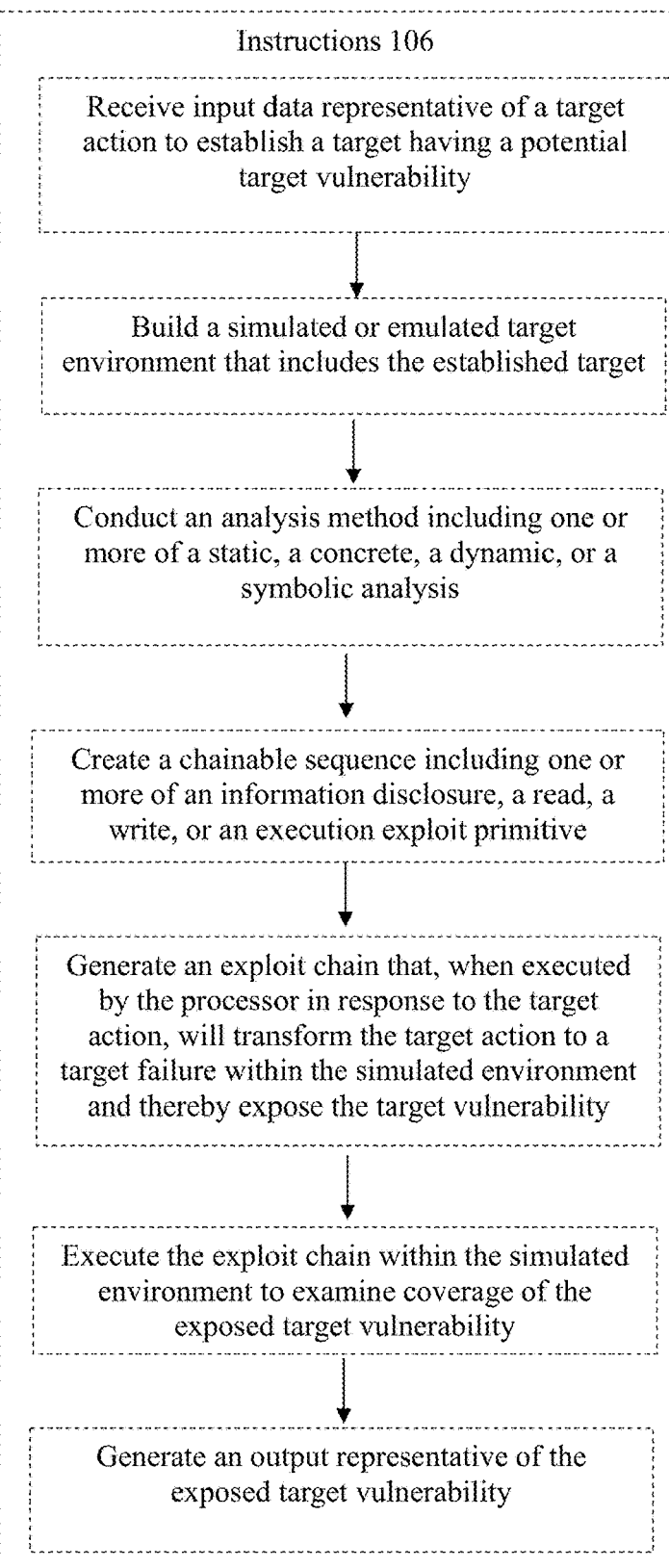
Figure 2:
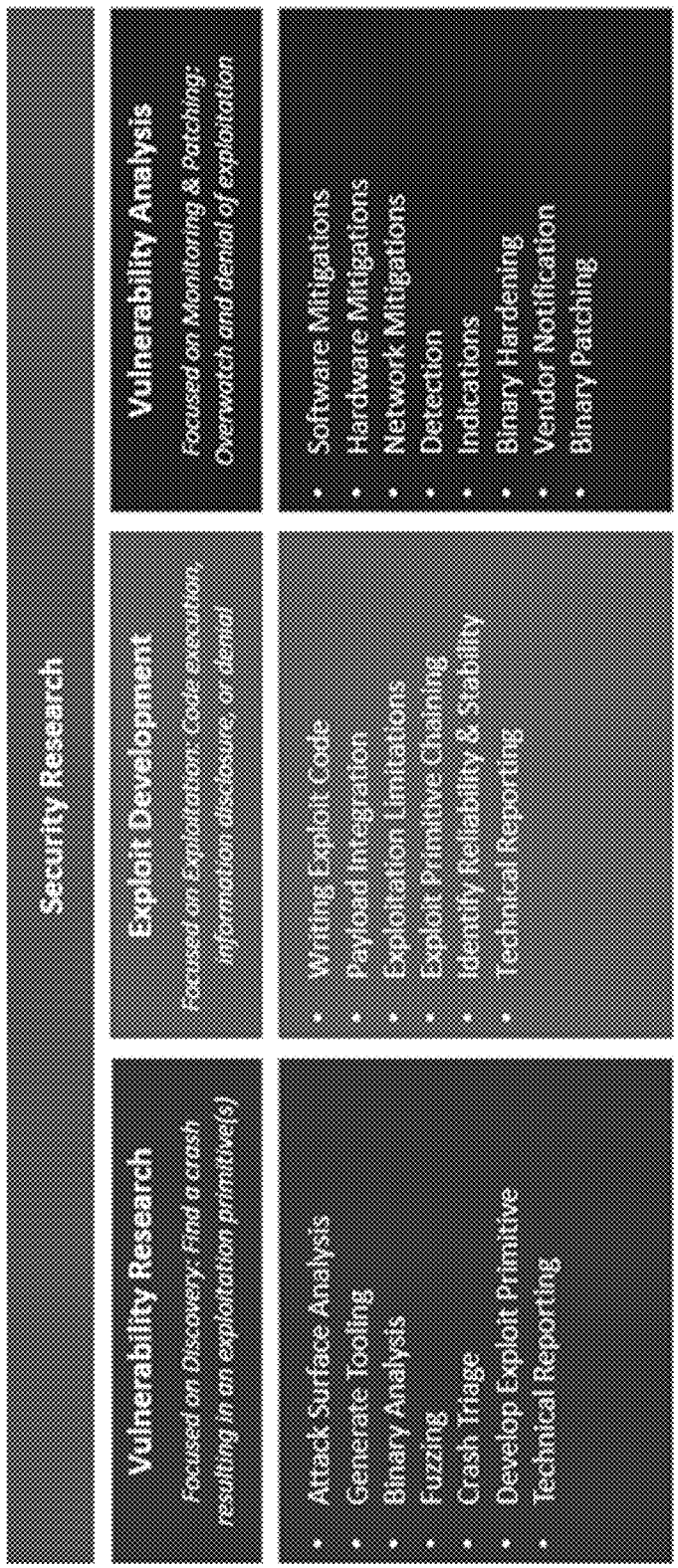
FIG. 2 shows exemplary security research categories and types of activities inside each activity.
Figure 3:
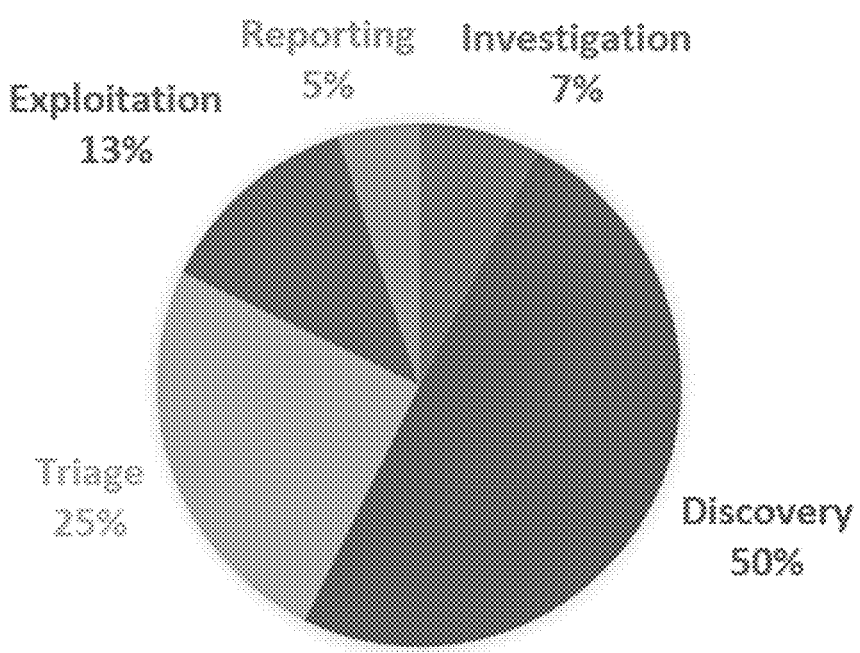
FIG. 3 shows exemplary vulnerability research and exploit development activities and associated relative level of effort.
Figure 4:
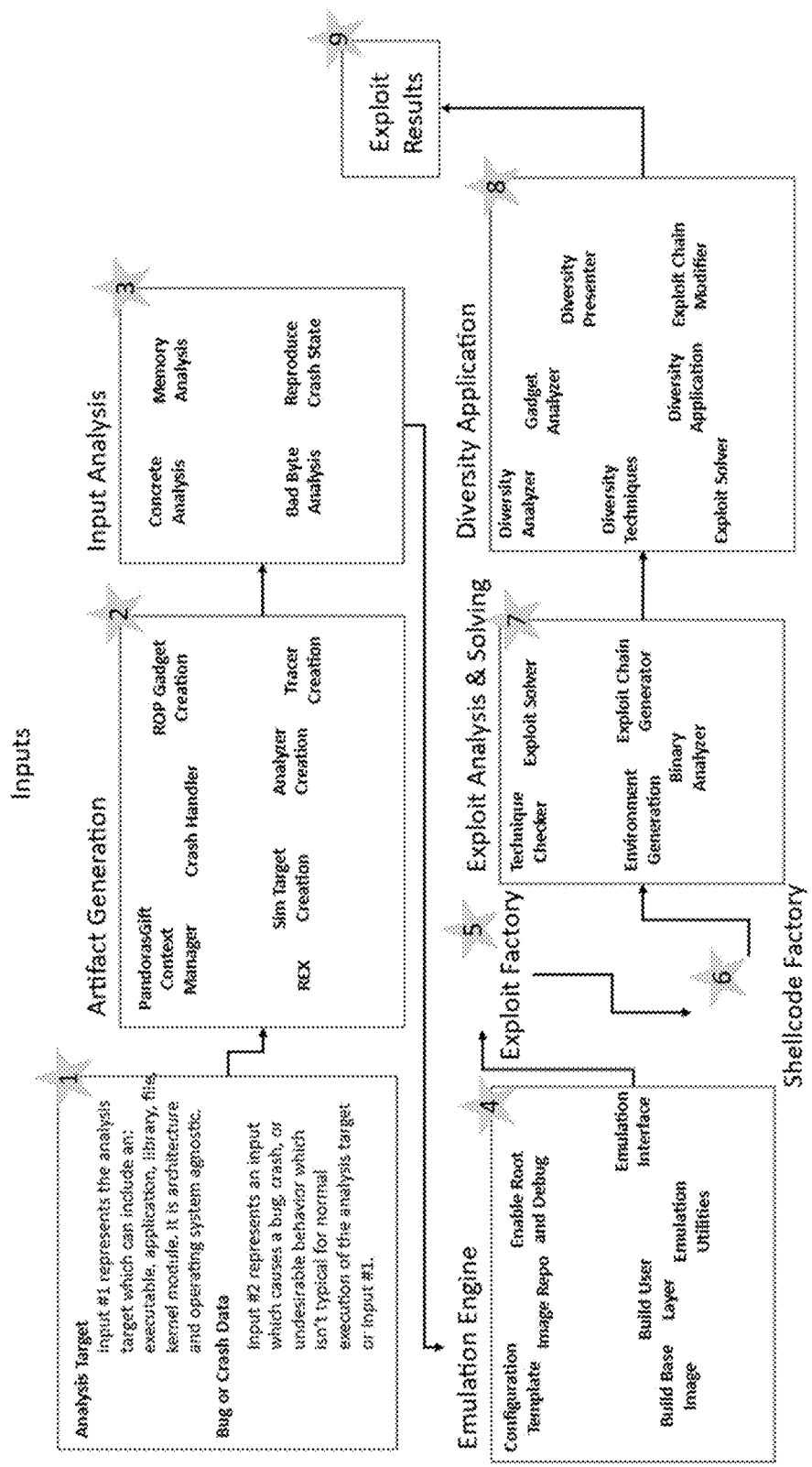
FIGS. 4-9 show exemplary flow processes for generating exploit result outputs from a target input and a bug input.
Figure 5:
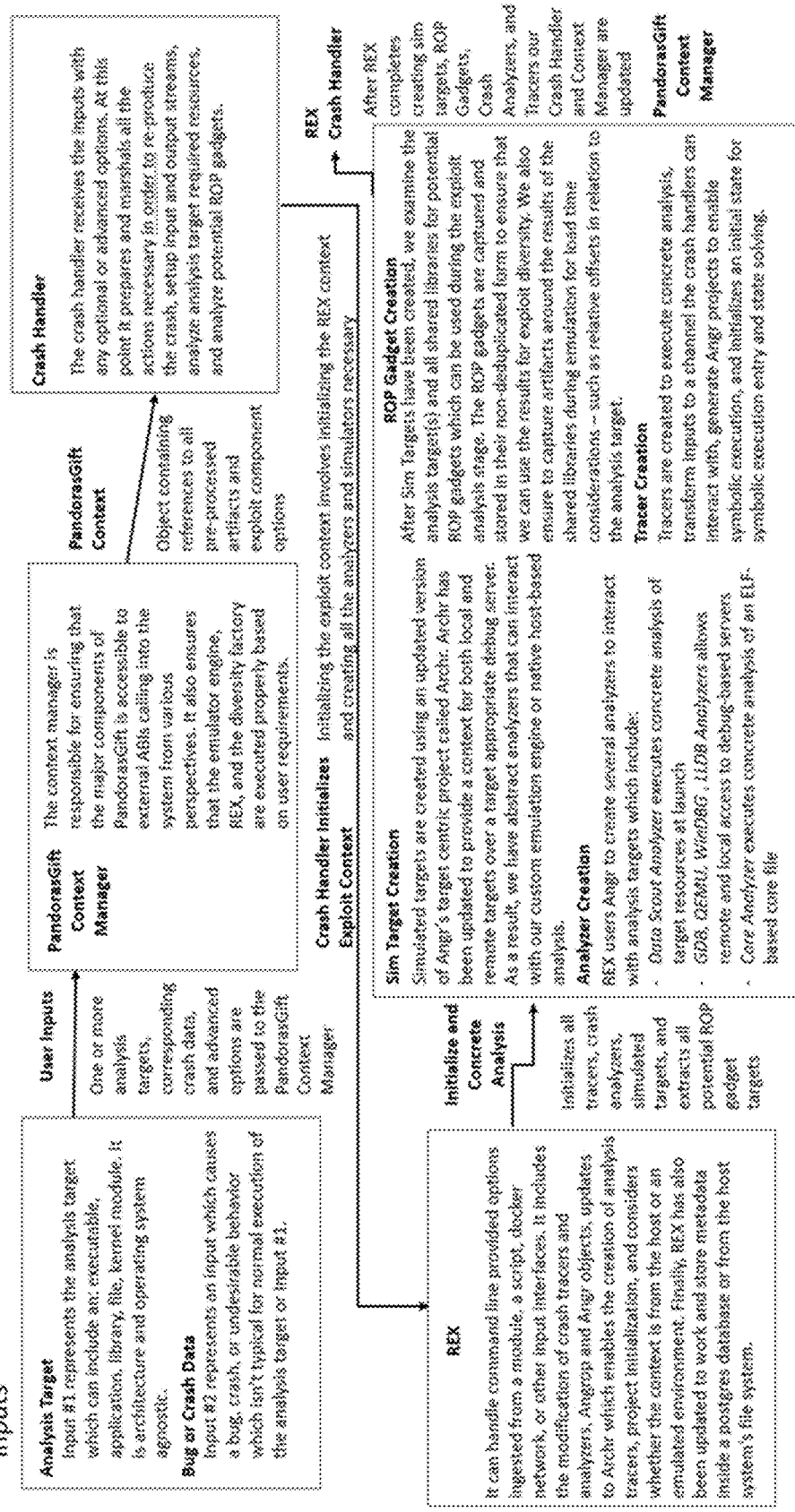
Figure 6:
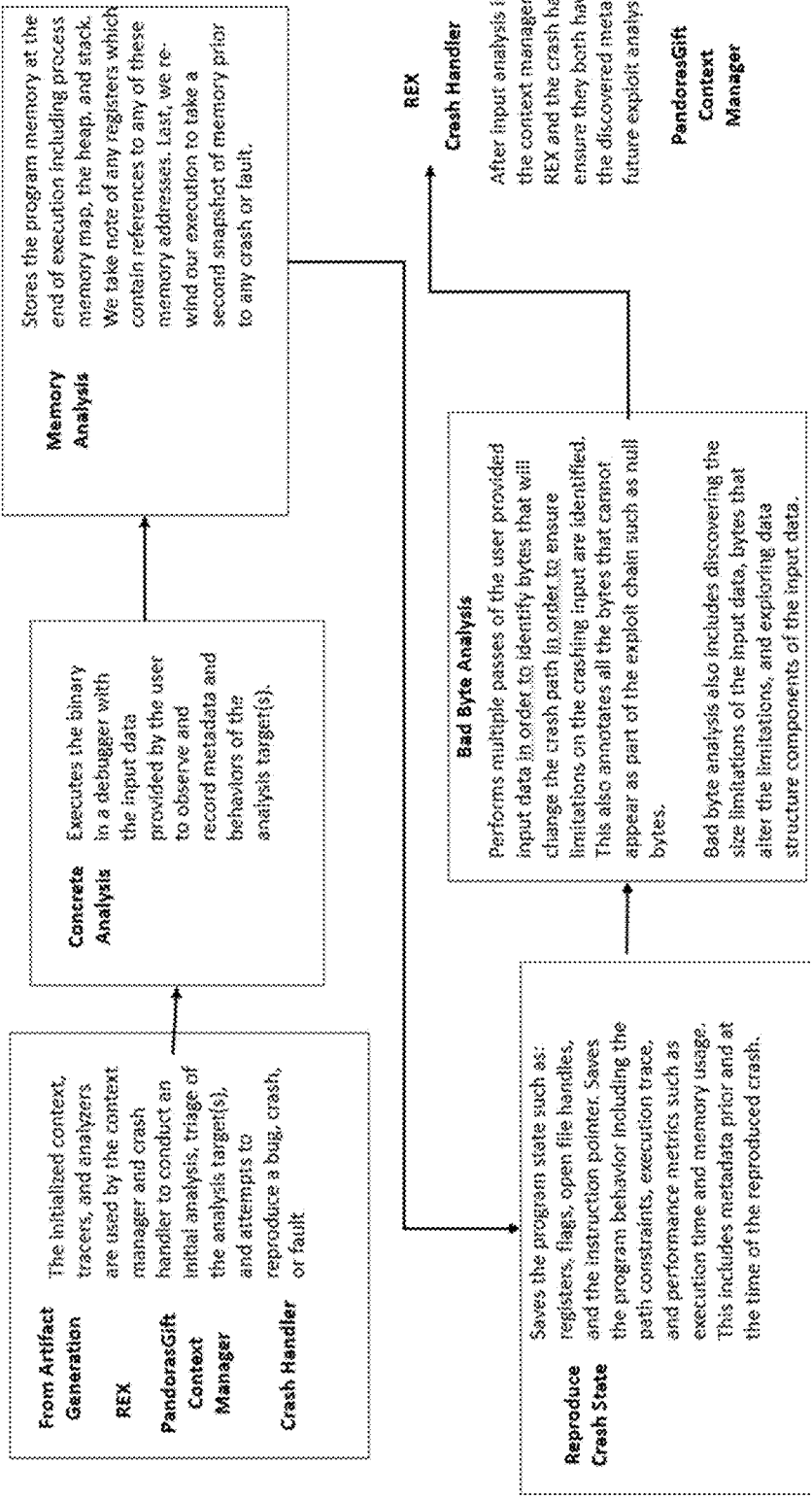
Figure 7:
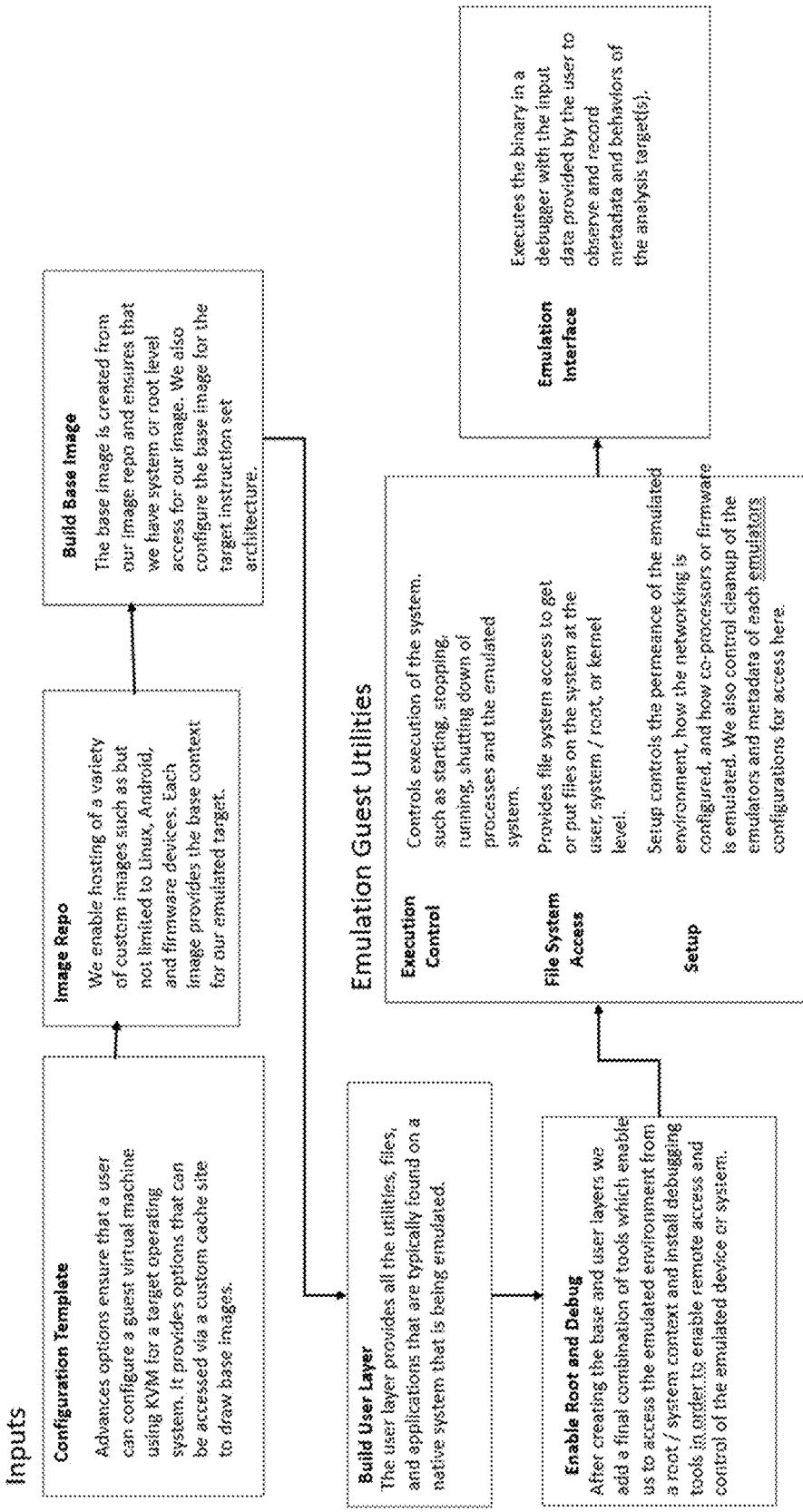
Figure 8:
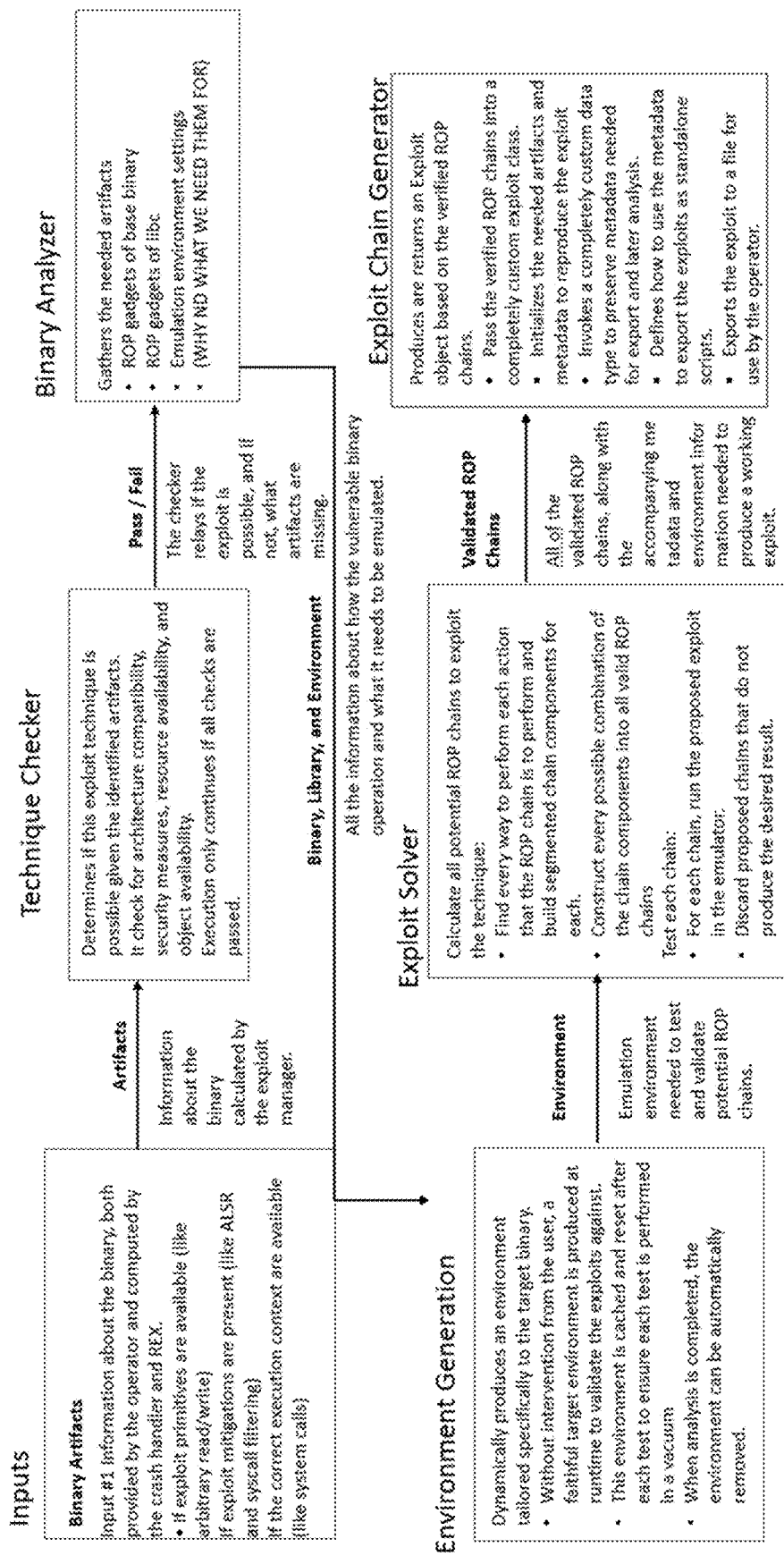
Figure 9:
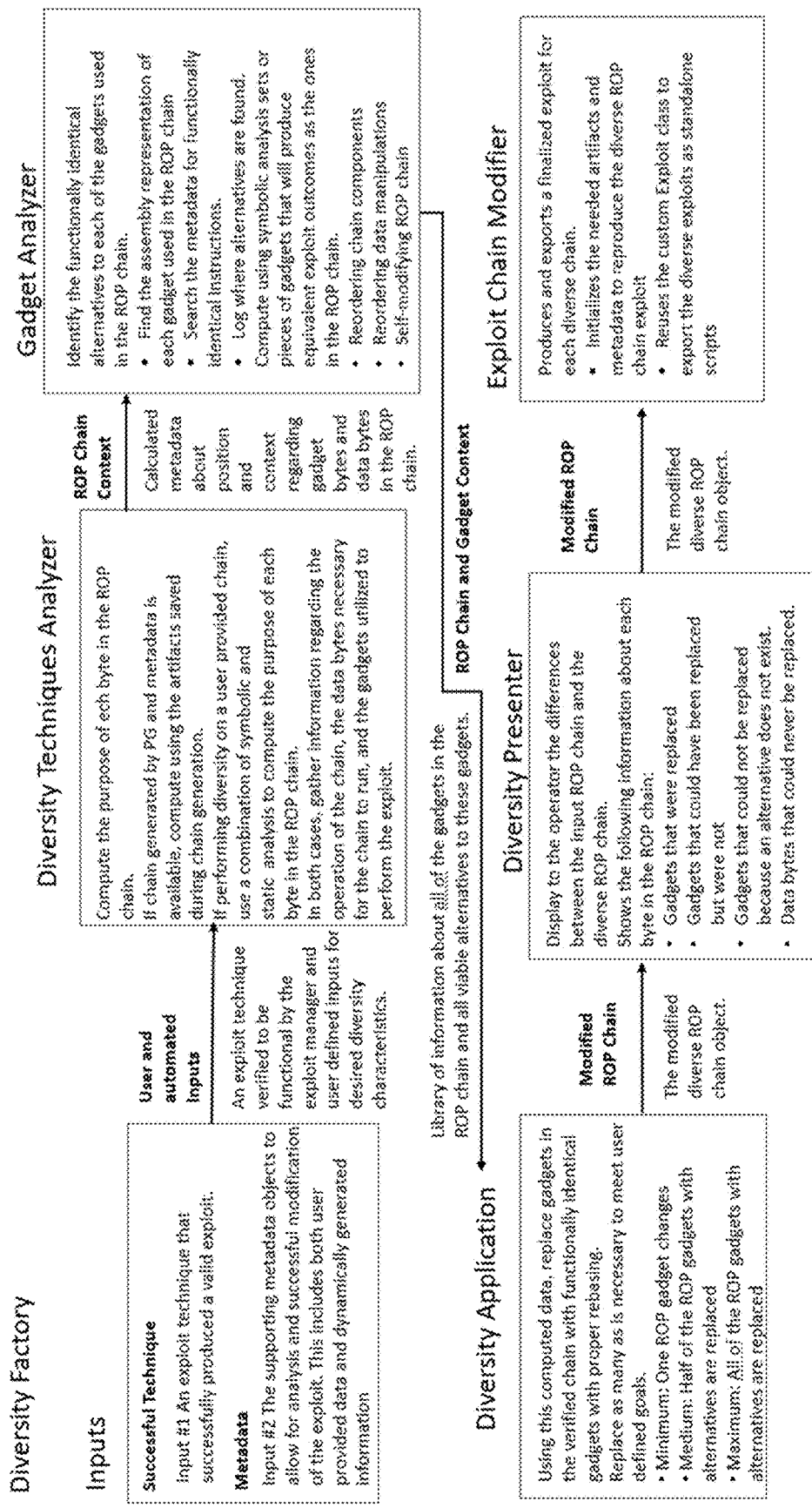

Referring to FIGS. 1-3, embodiments disclosed herein improve operation of one or more processors 102. This can be achieved by implementing a process on a processor 102 based on a data structure including executable exploit scripts and binaries, which can be saved to memory 104 to be used locally or remotely. This data structure can be generated via an algorithm or model implemented by the processor 102 to generate specific executable exploit scripts and binaries that lead to efficiencies and improved performance. For instance, an exploit engine can be used to execute the exploits against a target (e.g., a desired software, firmware, device, operating system, etc.) to determine if, and to what extent, the target is exploitable. The exploit scripts can include signatures that span or translate across one or more exploitation techniques. Each exploitation technique can be differing and/or disparate from the other.

As noted above, existing techniques require different and disparate exploitation techniques, which results in the need for concerted action of the exploitation techniques, increased computational resources (e.g., processing time, processing speed, memory, etc.), increased time to process data, and generally requires human interaction in the form of subject matter experts. Yet, the methods and systems 100 disclosed herein can automatically generate one or more exploits, wherein any number of them can be diversified (e.g., able to be used for any number or types of targets). In other words, the methods disclosed herein allow the system 100 to be agnostic to any exploitation technique, and further allows the system 100 to automatically generate exploits with little or no human interaction.

When plural exploits are compiled and implemented, the system 100 can dynamically examine any target at execution time for malicious behavior. Thus, instead of having multiple exploit tools that have to be operated in an orchestrated way and with the assistance of subject matter experts, the techniques disclosed herein can automate the entire process and dynamically examine any target at execution time for malicious behavior at reduced processing times and with reduced expense of computational resources.

An exemplary embodiment can relate to a system 100 for automated exploit generation. The system 100 can include one or more processors 102. The system 100 can include one or more memories 104. One or more of the memories 104 can be associated with the processor(s) 102. The memory(ies) 104 can have instructions 106 stored thereon that when executed can cause the processor(s) 102 to perform one or more of the operations disclosed herein. While exemplary embodiments may describe and/or illustrate one processor 102 and one memory 104, it is understood that the system 100 can include any number of processors 102 and memories 104.

The processor 102 can be any of the processors 102 disclosed herein. The processor 102 can be part of or in communication with a machine (logic, one or more components, circuits (e.g., modules), or mechanisms). The processor 102 can be hardware (e.g., processor, integrated circuit, central processing unit, microprocessor, core processor, computer device, etc.), firmware, software, etc. configured to perform operations by execution of instructions embodied in algorithms, data processing program logic, artificial intelligence programming, automated reasoning programming, etc. Use of processors 102 herein can include any one or combination of a Graphics Processing Unit (GPU), a Field Programmable Gate Array (FPGA), a Central Processing Unit (CPU), etc. The processor 102 can include one or more processing modules. A processing module can be a software or firmware operating module configured to implement any of the method steps disclosed herein. The processing module can be embodied as software and stored in memory 104, the memory 104 being operatively associated with the processor 102. A processing module can be embodied as a web application, a desktop application, a console application, etc.

The processor 102 can include or be associated with a computer or machine readable medium. The computer or machine readable medium can include memory 104. The computer or machine readable medium can be configured to store one or more instructions 106 thereon. The instructions 106 can be in the form of algorithms, program logic, a model, etc. that cause the processor 102 to perform any of the functions described herein.

Any of the memory 104 discussed herein can be computer readable memory configured to store data. The memory 104 can include a volatile or non-volatile, transitory or non-transitory memory, and be embodied as an in-memory, an active memory, a cloud memory, etc. Embodiments of the memory 104 can include a processor module and other circuitry to allow for the transfer of data to and from the memory 104, which can include to and from other components of a communication system. This transfer can be via hardwire or wireless transmission. The communication system can include transceivers, which can be used in combination with switches, receivers, transmitters, routers, gateways, wave-guides, etc. to facilitate communications via a communication approach or protocol for controlled and coordinated signal transmission and processing to any other component or combination of components of the communication system. The transmission can be via a communication link. The communication link can be electronic-based, optical-based, opto-electronic-based, quantum-based, etc.

The processor 102 can be in communication with other processors of other devices (e.g., a computer device, a desktop computer, a laptop computer, a computer system, etc.). Any of those other devices can include any of the exemplary processors disclosed herein. Any of the processors can have transceivers or other communication devices/circuitry to facilitate transmission and reception of wireless signals. Any of the processors can include an Application Programming Interface (API) as a software intermediary that allows two applications to talk to each other. Use of an API can allow software of the processor 102 of the system 100 to communicate with software of the processor of the other device(s), if the processor 102 of the system 100 is not the same processor of the device.

Any data transmission between the processor 102 and memory 104, between the processor 102 and a database, and between the processor 102 and processors of other devices, etc. can be via a pull operation (e.g., the processor 102 can pull the data) or a push operation (e.g., the data can be pushed to the processor 102). The processor 102 can receive the data in steaming format, or store it in memory 104 before being processed. In addition, embodiments of the algorithm, model, etc. disclosed herein can be developed as an application software (an "App") to be implemented on a processor of a device. The App can be sent via a steaming format, or the App can be sent and stored on a memory associated with or accessed by the device.

As noted herein, the processor 102 can be configured to be a component of, used in combination with, or in communication with another device/system 100—e.g., this can include the processor 102 being part of the device/system 100, the device/system 100 being part of the processor 102, the processor 102 in communication with the device/system 100, etc. "Being part of" can include being on a same substrate or integrated circuit. For instance, the processor 102 can be a component of, used in combination with, or in communication with a predictive modeling system, a decision support system, an automated control system, etc. The processor 102 can use the model or algorithm or provide the model or algorithm to the device/system to assist with or augment the performance of these devices/systems. Output of the model or algorithm can be used by the device/system to assist with or augment predicting or reacting to vulnerabilities and/or attacks, assist with or augment determining or modifying responses to vulnerabilities and/or attacks, etc.

As noted herein, the memory 104 of the system 100 can have instructions 106 stored thereon that when executed can cause the processor 102 to perform one or more of the operations disclosed herein. Instructions 106 can cause the processor 102 to receive input data representative of a target action to establish a target having a potential target vulnerability. The target can be one or more of a software target, a device target, an operating system target, etc. that a user wishes to test for vulnerabilities (e.g., whether the target is exploitable and to what extent it is exploitable)—e.g., a user may wish to expose the target's vulnerability. The target vulnerability can include an error vulnerability, a flaw vulnerability, an undesired behavior vulnerability, etc. Exposing the target vulnerability can include exposing a proof of the target vulnerability.

The input data can be data representative of one or more targets, data representative something that can cause disruption of an operation(s) of a target(s), etc. It is contemplated for the input data to include at least two types of data: 1) data representative of a characteristic of the target; 2) data representative something that can cause operational disruption of the target. For instance, the first type of input data can be data representative of an executable, an application, a library, a file, a kernel module, etc. of the target. The second type of input data can be data representative of a things that can cause a bug, a crash, an undesirable behavior, a behavior that it not typical for normal execution of the targets, etc. The processor 104 can use the input data to represent one or more target actions of the target and one or more potential vulnerabilities of the target to establish a target (e.g., an "established target") having a potential target vulnerability.

Instructions can cause the processor 102 to build one or more simulated or emulated target environments that includes the established target. The simulated or emulated target environment can include one or more physical devices (e.g., desktop device, server device, mobile device, etc.) or networks (e.g., Local Area Network, Personal Area Network, etc.) that would operate with the established target.

Figure 10:
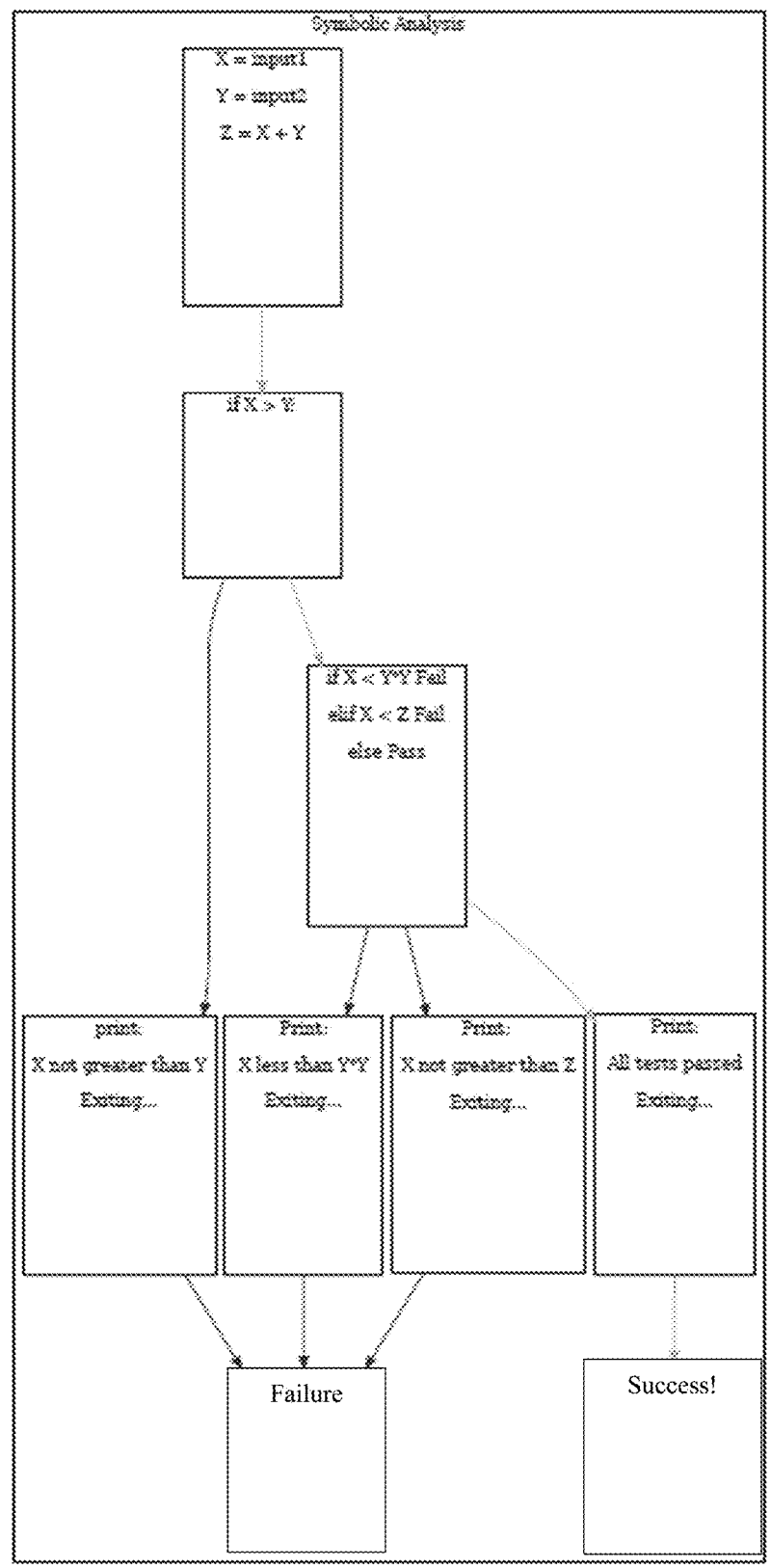
FIG. 10 shows an exemplary symbolic analysis process.

Instructions 106 can cause the processor 102 to conduct one or more analysis methods including one or more of a static, a concrete, a dynamic, a symbolic analysis, etc. The analysis method can include implementing one or more exploitation technique to create one or more artifacts that can be used to discover one or more anomalies. The analysis method can be done to analyze source code to find security vulnerabilities that can make the target (or simulated or emulated target) susceptible to attack, analyze how a suspected application of a target (or simulated or emulated target) performs when executed in a virtual machine, systematically explore different execution paths of a target (or simulated or emulated target) while considering all possible inputs and their symbolic representations, etc. FIG. 10 shows an exemplary symbolic analysis, and in particular a representation of an angr symbolic execution exploration. In this example, arguments are represented as variables, the various execution paths are enumerated, and the success condition is identified. A path that ends at the success condition and begins as the start of the program is selected. With this set up, angr can solve for what conditions need to be met to follow the success path.

Instructions 106 can cause the processor 102 to create one or more chainable sequences including one or more of an information disclosure (e.g., obtaining sensitive or protected information about a target application), a read (e.g., retrieving data from a memory location or storage device), a write (e.g., transmitting data to a memory location or storage device), an execution exploit primitive (e.g., a capability granted during an exploit, such as n-byte linear heap overflow, memory read/write, PC control, function calling, etc.), etc. The chainable sequence can represent a compilation of source code, events, performances, execution paths, etc. from based on the analysis method that led to a vulnerability or a possible exploitation of the target (or simulated or emulated target). There can be one or more chainable sequences for each target action. A chainable sequence for one target action can be the same as or different from a chainable sequence for another target action.

Instructions 106 can cause the processor 102 to generate one or more exploit chains that, when executed by the processor 102 in response to the target action, can transform the target action to a target failure within the simulated or emulated target environment and thereby expose the target vulnerability. An exploit chain can include one or more chainable sequences. For instance, some targets (e.g. Windows operating system) can be well protected. Consequently, these well-protected targets may require plural exploit chains, each having different types, scopes, and scales of attack vectors to exploit a vulnerability, defeat a security feature, overcome an exploit mitigation operation, etc.

Instructions 106 can cause the processor 102 to execute one or more exploit chains within the simulated or emulated target environment to examine coverage of the exposed target vulnerability(ies). Examining coverage of an exposed target vulnerability can assessing the scope and scale of the vulnerability via examination of action(s) as artifact(s). An artifact can include a trace (e.g., system logs, browser histories, files, registry keys, memory dumps, network traffic captures, timestamps, etc.) of the malicious act that exploits a vulnerability. Artificial intelligence, machine learning etc. techniques can be used to classify and examine actions. For instance, artificial intelligence, machine learning, etc. models can be configured to perform behavioral and intent clustering of trace data. This/these model(s) can be implemented by the processor 102 to examine coverage of the exposed target vulnerability(ies).

An exploit chain can include a series of events that transforms the target action to the target failure. An exploit chain can be generated from an exploit primitive. For instance, an exploit chain can include one or more of a path constraint, an execution trace, a performance metric, metadata, etc. The metadata can include pre-target failure metadata and post-target failure metadata. As can be appreciated from the above, an artifact can create metadata that can be signatured (e.g., attaching a digital signature to code to build forms of packed code (e.g., binaries, containers, etc.) to facilitate verifying its integrity and authenticity). In addition, the system 100 can create behavioral signatures that can translate across the different and disparate exploitation techniques. A behavioral signature can be a target application flaw, for example, that is annotated with metadata, a register state, a crash input limitation, a description of the flaw, a class of the vulnerability, etc.

Instructions 106 can cause the processor 102 to generate an output representative of the exposed target vulnerability.

The output can be a report that includes a summary, a statistical breakdown, a graphical representation, a table, etc. of the vulnerability(ies) of the simulated or emulated target environment. The output can be displayed on a computer screen via a user interface, for example. The output representative of the exposed target vulnerability can be generated in one or more diversified forms. This can include an exported exploit demonstration script (e.g., Python, Perl, Bash, etc.), system executable shellcode, etc.

An exemplary embodiment can relate to one or more computer readable medium having instructions 106 thereon that when executed by a processor 102 can cause the processor 102 to perform one or more of the operations disclosed herein. Instructions 106 can cause the processor 102 to receive input data representative of a target action to establish a target having a potential target vulnerability. Instructions 106 can cause the processor 102 to build a simulated or emulated target environment that includes the established target. Instructions 106 can cause the processor 102 to conduct an analysis method including one or more of a static, a concrete, a dynamic, or a symbolic analysis. Instructions 106 can cause the processor 102 to create a chainable sequence including one or more of an information disclosure, a read, a write, or an execution exploit primitive. Instructions 106 can cause the processor 102 to generate an exploit chain that, when executed by a processor 102 in response to the target action, can transform the target action to a target failure within the simulated or emulated target environment and thereby expose the target vulnerability. Instructions 106 can cause the processor to execute the exploit chain within the simulated or emulated target environment to examine coverage of the exposed target vulnerability. Instructions 106 can cause the processor 102 to generate an output representative of the exposed target vulnerability.

An exemplary embodiment can relate to a method for automated exploit generation. The method can involve receiving input data representative of a target action to establish a target having a potential target vulnerability. The method can involve building a simulated target environment that includes the established target. The method can involve conducting an analysis method including one or more of a static, a concrete, a dynamic, or a symbolic analysis. The method can involve create a chainable sequence including one or more of an information disclosure, a read, a write, or an execution exploit primitive. The method can involve generating an exploit chain that, when executed by a processor 102 in response to the target action, can transform the target action to a target failure within the simulated or emulated target environment and thereby expose the target vulnerability. The method can involve executing the exploit chain within the simulated or emulated target environment to examine coverage of the exposed target vulnerability. The method can involve generating an output representative of the exposed target vulnerability.

EXAMPLES

The following are exemplary systems, methods, and implementations of the embodiments disclosed herein. While the examples may focus on one implementation, it is understood that this is exemplary and the embodiments disclosed herein are not limited thereto.

Example I

Referring to FIGS. 4-12, the system 100 can include one or more operating modules (e.g., modules, engines, factories, tools, etc.). As a non-limiting example, the operating modules can include an artifact generation module, an input analysis module, an emulation module, an exploit analysis and filing module, and a diversity module, etc. More or less operating modules can be used.

It is contemplated for input data to be received by the system 100, which can be receive by one or more of the operating modules. The input data can be data representative of one or more targets, data representative something that can cause disruption of an operation(s) of a target(s), etc. As a non-limiting example, input data can include input data #1 (data representative of a target such as an executable, an application, a library, a file, a kernel module, etc.), input #2 (data representative of a things that can cause a bug, a crash, an undesirable behavior, a behavior that it not typical for normal execution of the target(s) or of input data #1), etc. The input data can be entered via a user (e.g., via a user interface), can be extracted from a file of a target(s) and entered automatically, etc. Any of the input data can be sent to or processed by the artifact generation module, the input analysis module, the emulation module, the exploit analysis and filing module, and/or the diversity module, etc. before generating an output.

The artifact generation module can include a content manager engine responsible for ensuring that component(s) of the model or algorithm is/are accessible to external ABIs calling into the system 100 from various perspectives. It can also ensure that the other modules are executed properly based on user requirements. It can also generate an object containing references to all processed artifacts and exploit component options. The artifact generation module can include a crash handler engine configured to receive input data with any optional or advanced options. The crash handler engine can prepare and marshal all the actions necessary in order to re-produce a crash, setup input and output a stream, analyze target-required resources, analyze potential Return Oriented Programming (ROP) gadgets, etc. The crash handler engine can handle command line to provide options ingested from a module, a script, docker container, other input interfaces, etc., which can include modification(s) of crash tracers and analyzers, Angrop objects, angr objects, updates to Archr, etc. which can enable the creation of analysis tracers, project initialization, etc. The crash handler engine can also consider whether the context is from the host or an emulated environment.

The system 100 can also include a REX module configured to work and store metadata inside a postgres database or from the host system's file system. The REX module can initialize tracers, initialize crash analyzers, initialize simulated targets, and extract potential ROP gadget targets. A simulated target(s) can be created using an updated version of angr's target centric project called Archr. For instance, Archr can provide a context for both local and remote targets over a target appropriate debug server. As a result, the system 100 can generate abstract analyzers that can interact with the emulation module or native host-based analysis. The REX module can use angr, for example, to create several analyzers to interact with analysis targets, which can include one or more of:

Data Scout Analyzer: can execute concrete analysis of target resources at launch GDB, QEMU, WinDBG, etc.;
LLDB Analyzer: can allow for remote and local access to debug-based servers; or
Core Analyzer: can execute concrete analysis of an ELF-based core file.

After a simulation target(s) is created, the system 100 can examine the target(s) and all shared libraries for potential ROP gadgets which can be used during one or more exploit analysis stages.

The ROP gadgets can be captured and stored in their non-deduplicated form. This can allow the system 100 to use the results for exploit diversity. Artifacts can be captured around the results of the shared libraries during emulation for load time considerations—e.g., relative offsets in relation to the analysis target. Tracers can be created to: 1) execute concrete analysis; 2) transform inputs to a channel the crash handlers can interact with; 3) generate angr projects to enable symbolic execution; and/or 40 initialize an initial state for symbolic execution entry and state solving.

The crash handler engine and/or the context manager engine can be updated after the REX module completes creating simulated target(s), ROP gadgets, crash analyzers, and tracers.

The initialized context, tracers, and analyzers can be used by the context manager engine and crash handler engine to: 1) conduct an initial analysis, 2) triage of the target(s), and/or 3) attempt to reproduce a bug, crash, and/or fault. The context manager engine and crash handler engine can execute the binary in a debugger with the input data received into the system 100 to observe and record metadata and behaviors of the target(s). The context manager engine and crash handler engine can stores the program memory at the end of execution, which can be in the form of a process memory map, a heap, a stack, etc. The system 100 can tag any registers which contain references to any of these memory addresses. The system 100 can then re-wind the execution to take a second snapshot of memory prior to any crash or fault. The system 100 can then saves the program state such as: registers, flags, open file handles, instruction pointer, etc. The system 100 can also save the program behavior, which can include path constraint(s), execution trace(s), performance metric(s) (e.g., execution time, memory usage, etc.), etc. This can include saving metadata prior and at the time of the reproduced crash.

The system 100 can perform one or more passes of the received input data in order to identify bytes that will change the crash path in order to ensure limitations on the crashing input are identified. During these pass(es), the system 100 can annotate the bytes that cannot appear as part of the exploit chain such as null bytes. Bad byte analysis can also include discovering the size limitations of the input data, bytes that alter the limitations, exploring data structure components of the input data, etc. After input analysis is complete, the context manager engine can update the REX module and the crash handler engine to ensure they both have access to the discovered metadata for future exploit analysis.

The emulation module can use one or more configuration templates to configure a guest virtual machine (e.g., using KVM) for a target that is an operating system. For instance, the configuration template can provides options that can be accessed via a custom cache site to draw base images. The system 100 can host a variety of custom images, such as Linux, Android, firmware devices, etc. Each image can provide the base context for an emulated target. The base image can be created from an image repo and ensures that there is system or root level access for the image. The system 100 can also configure the base image for the target instruction set architecture. For instance, the user layer can provide one or more utilities, files, applications, etc. that are typically found on a native system that is being emulated.

After creating the base and user layers, the system 100 can add a final combination of tools which enables access the emulated environment from a root/system context. The system 100 can then install debugging tools in order to enable remote access and control of the emulated device or system.

The emulation module can be configured to perform starting, stopping, running, shutting down of processes, etc. of the emulated target. It can also provide file system access to receive or transmit files on the emulated target at the user, system/root, or kernel level. It can also setup controls influencing the permeance of the emulated environment, how the networking is configured, how co-processors or firmware is emulated, etc. It can also control cleanup of the emulators and metadata of each emulator's configurations. It can also execute the binary in a debugger with the input data received into the system 100 to observe and record metadata and behaviors of the target(s).

The system 100 can then perform a ROP analysis. With input data #1, information about the binary, can be computed by the exploit analysis and filing module. The crash handler engine and the REX module can determine if exploit primitives are available (e.g., arbitrary read/write), if exploit mitigations are present (e.g., ALSR, syscall filtering, etc.), if the correct execution context are available (e.g., system calls), etc. The exploit analysis and filing module can determine if the exploit technique is possible given the identified artifacts. It can check for architecture compatibility, security measures, resource availability, object availability, etc. The system 100 can be configured to only allow execution to continue if all checks are passed. The exploit analysis and filing module can indicate if the exploit is possible, and if not, what artifacts are missing. The exploit analysis and filing module can also gather the needed artifacts (e.g., ROP gadgets of base binary, ROP gadgets of libc, emulation environment settings, etc.). The exploit analysis and filing module can dynamically produce an environment tailored specifically to the target binary.

As can be appreciated from the above, a faithful target environment can be produced at runtime to validate the exploits against without intervention from the user. This environment can be cached and reset after each test to ensure each test is performed in a vacuum. When analysis is completed, the environment can be automatically removed.

For the emulation environment, it can be beneficial to test and validate potential ROP chains. Validating can involve calculating all potential ROP chains to exploit the technique, discovering every way to perform each action that the ROP chain is to perform and build segmented chain components for each, constructing every possible combination of the chain components into all valid ROP chains. Testing can involve running the proposed exploit in the emulator for each chain, and discarding proposed chains that do not produce the desired result. It is contemplated for a working exploit to include the validated ROP chains, along with the accompanying metadata and environment information.

The system 100 can then generate one or more exploit chains. Exploit object(s) can be generated based verified ROP chains. The verified ROP chains can be placed into a custom exploit class. The system 100 can initialize the needed artifacts and metadata to reproduce the exploit, invoke a completely custom data type to preserve metadata needed for export and later analysis, and define how to use the metadata to export the exploits as standalone scripts. The system 100 can then exports the exploit to a file for use.

The diversity module can receive input data #1 and extract an exploit technique that successfully produced a valid exploit, and receive input data #2 and extract the supporting metadata objects to allow for analysis and successful modification of the exploit. It can gather information regarding the operation of the chain, gather the data bytes necessary for the chain to run, gather the gadgets utilized to perform the exploit, compute the purpose of each byte in the ROP chain, and determine whether the chain generated by metadata is available. The diversity module can use symbolic analysis, static analysis, etc. to compute the purpose of each byte in the ROP chain. The results can allow the diversity module to calculate metadata about position and context regarding gadget bytes and data bytes in the ROP chain, identify the functionally identical alternatives to each of the gadgets used in the ROP chain, identify the assembly representation of each gadget used in the ROP chain, search the metadata for functionally identical instructions, and log where alternatives are found.

The analysis the diversity module performs can provide for pieces of gadgets that will produce equivalent exploit outcomes as the ones in the ROP chain. This can facilitate reordering chain components, reordering data manipulations, provide for a self-modifying ROP chain, etc. A ROP chain and gadget context (library of information about all of the gadgets in the ROP chain and all viable alternatives to these gadgets) can be generated therefrom. Using this computed data, the system 100 can replace gadgets in the verified chain with functionally identical gadgets with proper rebasing. The system 100 can replace as many as is necessary to meet user defined goals.

Once the modified diverse ROP chain object(s) is/are made, the system 100 can display these to the operator (e.g., via a user interface on a computer display screen). The display can demonstrate differences between the input ROP chain and the diverse ROP chain. The display can also shows the following information about each byte in the ROP chain: 1) gadgets that were replaced; 2) gadgets that could have been replaced but were not; 3) gadgets that could not be replaced because an alternative does not exist; and/or 4) data bytes that could never be replaced.

The system 100 can then produce and export a finalized exploit(s) for each diverse chain. This/these can be used to initialize the needed artifacts and metadata to reproduce the diverse ROP chain exploit(s), reuses the custom exploit class to export the diverse exploits as standalone scripts, etc.

Example II

Embodiments discloses herein can be referred to as automated exploitation generation (or Automated Exploitation Generation tool), which can include a process of using analysis to solve for the components or features needed to take advantage of a software flaw or vulnerability in a system or target binary with little to no human interaction.

Testing of embodiments demonstrate that the system can automatically generate multiple, diversified exploits for a set of inputs for analysis targets on any Instruction Set Architecture (ISA) and Operating System (OS) in compiled form.

Exploit development can be complicated, time consuming, and requires a hard-to-find set of skills, knowledge, and experience. In some cases, it can be difficult to adequately train and retain enough subject matter experts to keep pace with the mission needs. Subtle version differences across OS kernel may limit traditional OCO tools viability. Our Automated Exploitation Generation tool can take two inputs: software and binary input data. An exploit engine can analyze the software and the binary input in order to generate an exploit chain. The exploit chain can be generated through arithmetically solving for components in various unique techniques and injected into the crashing input. After the new input is generated, executable exploit scripts and binaries can be written to disk which can be used locally or remotely. An exploit engine may be used to: 1) determine if software or firmware is exploitable regardless of the ISA or OS; 2) create multiple, diversified exploits to take advantage of the vulnerability; and/or 3) expand viability of exploits to broader kernel distribution automatically. The result is that we can reduce the end-to-end exploit development lifecycle from 35 to 7 days (~80% reduction in time/effort).

Embodiments herein relate to systems and methods that can:
1. Automatically perform exploit analyses and generate exploits that can be applied to a target (e.g., a software target, a device target, or an operating system target) to identify vulnerabilities of the target.
2. Emulate an environment with exploit chains to test a target and determine reliability and stability of a set of resulting proof of vulnerability.
3. Automatically version probing and regression testing to determine vulnerability coverage.
4. Functions 1), 2), and/or 3) above can be applied to any architecture (e.g., it is architecturally independent) or operating system.

Governments face a significant challenge in defending networks and critical infrastructure from advanced persistent threats and organizations. Adversaries' attacks may be based on vendor released patches (e.g., within a week of release). Endpoint security has significant performance impacts that are continually in combat with host native protections. Techniques are antiquated relying primarily on file-based techniques. The only practical solutions with conventional systems is to rely heavily on network-based signatures and heuristics, sandboxing, or intensive targeted memory analysis of historical Operating System (OS) services. To address these problems and protect information systems and critical infrastructure innovative approaches to defensive measures, such as automation, artificial intelligence, and machine learning, may be used to reduce the time and effort needed to discover and respond to exploits executing in near-real time at scale.

Research Problem

As shown in FIG. 2, security research spans across multiple domains, all of which tend to require a specific set of skills and level of effort. Automated Vulnerability Research (AVR) and Exploit Development (ED) combined with Artificial Intelligence (AI) and Machine Learning (ML) can produce a feed for Vulnerability Analysis (VA). However, there are not any solutions which can approach the full range of security research which lends itself well to protecting cyber systems and information.

Inter-Process Communication (IPC)-based techniques can be applied to exploits at the time of execution. Generally, Exploit Delivery (ED) process use exploit techniques which create artifacts we can use to automatically discover anomalies which can feed into already existing host intrusion detection systems. IPC (Inter Process Communication) Analysis can 1) reduce the depth and breadth of skill needed to defend systems and critical data, 2) decrease or remove the time advantage for abusing patch gaps, 3) automate IPC protocols introspection, 4) increase the visibility for analysts examining threats, and/or 5) reduce the burden of analysts creating behavioral based detection rules and signatures.

Inter-Process Communication (IPC) Analysis

IPC Analysis can enable host-based detection engines to monitor the communication between processes. IPC Analysis can be a problem well suited for automation and AI/ML because it can vary across Operating Systems and can be protocol dependent. However, we can abstract the contents of the IPC away, examining the endpoint results. AI/ML behavioral and intent clustering can be used to examine those actions as artifacts. Artifacts from the IPC create metadata that we can signature. As a result, a technique can be created, dynamically examining a process at execution time for malicious behavior. The monitoring of IPC can also allow for the monitoring of kernel or system related resources, without significantly increasing the resource demand from the host.

Automating IPC analysis can allows us to create signatures which translate across exploitation techniques and tradecraft-detecting and stopping the root cause of a vulnerability or the events which allow an exploit to take advantage of a vulnerability.

Detection Enables Mitigation

Core problems preventing exploitation can revolve around patch gaps and zero-day exploits. The window between vulnerability disclosure and exploitation may be quick (e.g., one week), and there may be cases where exploitation occurred on a large scale within 48 hours of a Proof of Concept (POC) being made public. Four broad categories of detecting threats can be: (1) Modeling; (2) Configuration Analysis; (3) Threat Behavior; and (4) Indicators. Threat Behavior can be the most scalable and be used to identify techniques, tradecraft, and/or technical requirements for binaries or executable scripts. It can be a very time consuming and manual process that may be reliant on an individual analyst's experience and knowledge base to create behavioral signatures that can be detected by analyzing file artifacts or network signatures.

Vulnerability Analysis on first-party add-ons, third-party software, and network devices can significantly expand capability of detection across systems. Machine automation can support efficient exploration of the top 100+ platforms, many of which do not require lengthy exploit chains and can be developed quickly and cheaply. Automations in CRS can feed signature creation for IPC analysis—and broadly provide analysts detections that were previously unavailable.

Machine automation can quickly deploy signatures to mitigate known self-generated zero-days from the CRS and close the gap for known unpatched vulnerabilities. Building on our IPC analysis and CRS we can:

- Create unique IPC-based signatures and rules for supported networks, firewalls, and host-based tools which find our self-discovered zero-day POCs (Proof of Concept) and known unpatched/patched vulnerabilities;
- Build-in a user-controlled paranoia score which decides the actions taken when malicious activities, resource requests, or communications are taken by a given thread or process and found over IPC;
- Examine more complex code paths through the OS and system across applications and the kernel supplied user resources;
- Use human-led input and direction to multiply the coverage of concurrent analysis over programs of interest; and/or
- IPC Analysis enhances visualization tools enabling the same types of searches and queries that are afforded to network analysis, but over IPC instead.

Conclusion

Closing the patch gap and abstracting a way to detect exploits at execution time are powerful capabilities that can be enhanced through Artificial Intelligence and Machine Learning. Through implementing these tools, staff burdens may be reduced. Leveraging machine automation and artificial intelligence can reduce time, improve scale, create efficiencies of work output, lowering the skillset requirement, while also increasing the visibility of the introspection capabilities of Cyber Defenders.

Example III

The offensive cybersecurity mission is becoming increasingly challenging: (1) As adversary defense becomes more sophisticated and vendors patch vulnerabilities with greater agility, the time frame for discovering and leveraging vulnerabilities continues to shrink and (2) the available vulnerability research subject matter experts (SMEs) cannot keep pace with the growing number of targets. To maintain its cybersecurity dominance, the new approaches to security research may be developed-approaches that rely heavily on automation, artificial intelligence, and machine learning to reduce the time and effort needed to discover vulnerabilities and develop exploits.

Research Problem

As shown in FIG. 3, the process of identifying vulnerabilities and developing exploits generally consists of five primary activities, each of which requires a specific set of skills and level of effort. This process, which generally may take 3-12 months to execute, can be expedited and more frequently replicated by (1) reducing the depth and breadth of skill required to perform the activities, (2) decreasing the time it takes to execute an activity, and/or (3) reducing the number of manual tasks. The diversity of targets and the variety and nuance of tasks supporting each activity precludes a single approach to automating and/or streamlining the vulnerability research and exploit development process.

Investigation

An investigation seeks to optimize capability, time, and/or cost. An investigation typically begins by choosing one or more cyber targets that maximize the potential for the desired mission impact while balancing the difficulty of discovering vulnerabilities. Popular targets, such as Windows, are well protected, often exhibit higher code quality, and generally require multiple chains of software or hardware vulnerabilities to defeat security features and exploit mitigations. Static and dynamic analysis of less popular targets can increase the rate, value, and longevity of offensive exploits. The 2022 Verizon Data Breach and Investigations Report identifies web applications, email, carelessness, and desktop sharing software as the primary software vectors for attacks resulting in a breach. In the past two years, there has also been a rise in attacks on supply chains and partner software used within software enclaves. The CISA top 15 routinely exploited vulnerabilities confirm that targeting servers, third-party software, and software lacking vendor support continues to provide the best opportunities for case of exploitation. As a result, we can provide initial recommendations of likely targets for exploitation to our clients and then continue examining selected targets for vulnerabilities.

Targeting first-party add-ons (such as Microsoft IIS and Exchange), third-party software (such as Apache and Atlassian Confluence), and network devices (such as FortiOS and RouterOS) can significantly expand exploit access vectors. Machine automation can support efficient exploration of the top 100+ platforms, many of which do not require lengthy exploit chains and can be developed quickly and cheaply.

Discovery

The discovery process begins with capturing the interactions a host may have with a target binary, in order to reverse engineer and understand the code that allows the binary to execute, ultimately achieving adverse effects on the host system. Researchers take the information generated during their initial investigation and triage the best locations for fuzzing and initial manual analysis. The analysis can include multiple time-consuming tasks, such as conducting static and dynamic analysis of target software and/or creating a fuzzing harness to automatically explore accessible execution paths and potential software flaws. Generally, tooling is generated to orchestrate, analyze, and interact with selected target interfaces. At some point during discovery research, software flaws can be identified and annotated with enriched metadata, such as register state and crash input limitations, describing the flaw and potential class of vulnerability.

Machine automation can quickly identify bugs when source code is available, based on complex simulation of the completely parsed and linked application. When source code is not available, machines can be used to efficiently execute concurrent and parallel tasks, allowing us to:

Reduce human-based dynamic and static analysis;
Automate fuzzing harnesses and fuzzing target creation;
Expand heterogenous fuzzing strategies to optimize code coverage;
Examine more complex code paths through symbolic execution and dynamic input generation; and/or
Use human-led input and direction to multiply the coverage of concurrent analysis over the entire code base, Triage Automated discovery techniques (e.g., fuzzing) often produce a surplus of crashes and bugs, making it impractical for vulnerability researchers to analyze the volume of data and resulting in analysis of only a small sub-set of the information. Analysts examine the pre-conditions that lead to a crash, logical flaw, or execution condition that allows control of values in registers, or the ability to manipulate data in the program or memory which affects the intended control flow of the binary. This process also examines the specific conditions surrounding how, when, and why a specific input creates a vulnerable or exploitable condition for a given target. There are many duplicates, unexploitable bugs, and code paths that are unreachable from available attack surfaces or configurations. The result of crash triage is to provide a preliminary analysis on the exploitability of a given crash, the amount of time necessary to potentially generate a working proof of concept, and the potential reliability of a given crash.

Machine automation and AI can group similar crashes, allowing researchers to intelligently triage, and draw conclusions about, whole sets (or clusters) of crashes by analyzing only a few samples.

Exploitation

Modern exploit development involves defeating multiple defense mitigations (e.g., address randomization, non-executable data, code flow integrity, etc.). A successful attack chain must thwart each of these mitigations to succeed. For example, a basic memory corruption bug requires exploit developers to find corruptible memory space. This process involves creating primitive capabilities, like an information leak, or the ability to write arbitrary data to an arbitrary location. Each link in the attack chain may allow several options for which code and data to exploit. Certain dependencies and limits in the target mean that certain links in the chain are incompatible. Exploit developers search broadly and deeply to find all the links in a full chain.

Machine automation can help collect appropriate data structures within regions of memory containing attacker-controlled data which exploit developers can use to build exploit primitives and capabilities. AI can help with modeling each link to synthesize full attack chains.

Reporting

Once an exploit is generated it must be patched or maintained. We often use the same software as our adversaries and are vulnerable to the same bugs. Exploit maintenance involves characterizing the environment in which the exploit can operate (e.g., limits in dependability, payload size, etc.). The size and layout of data and code changes between versions and typically bugs will eventually get fixed or mitigated. Continuous testing is needed to confirm identified bugs are fixed as new software is updated and released.

Figure 11:
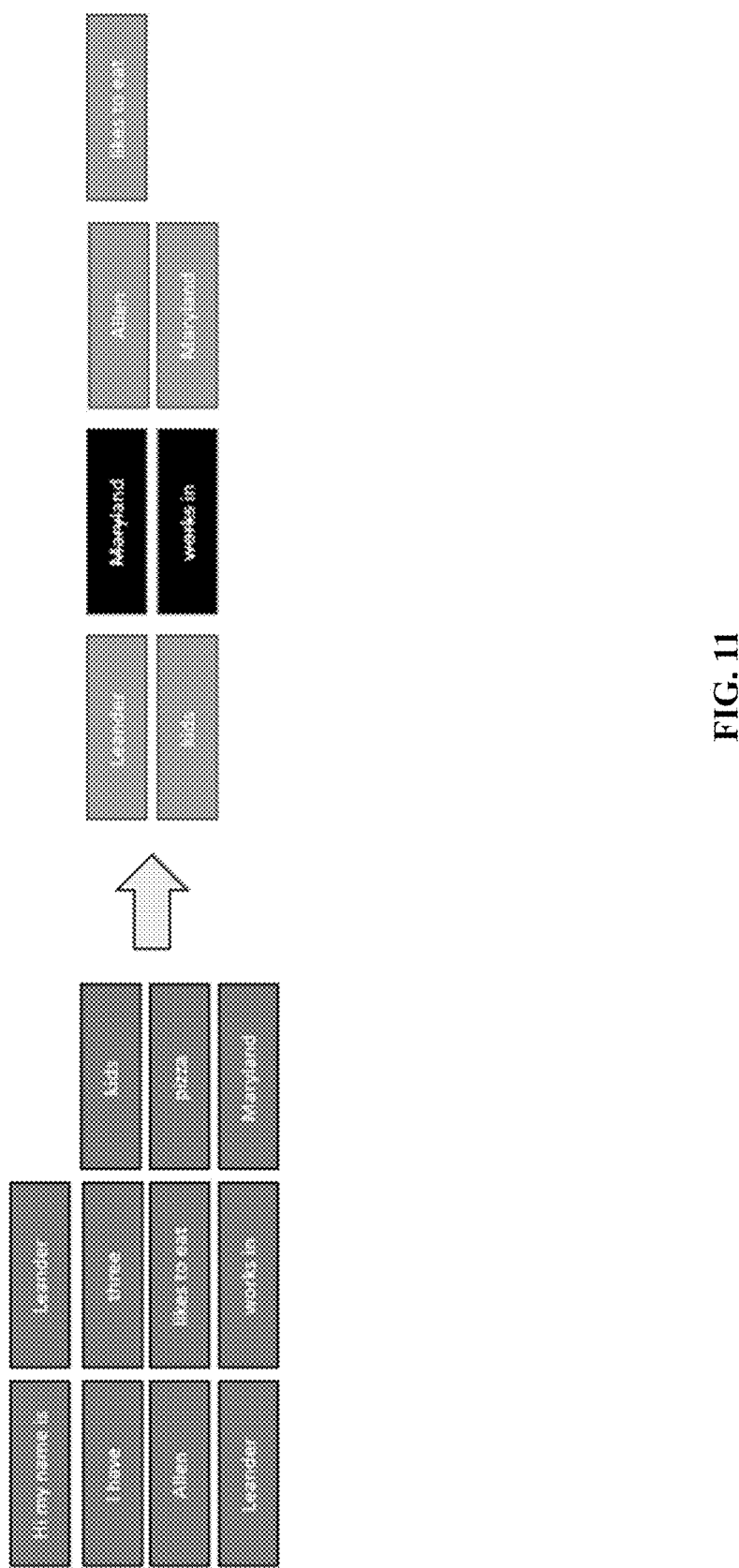
FIG. 11 shows an exemplary output using Return Oriented Programming.
Figure 12:
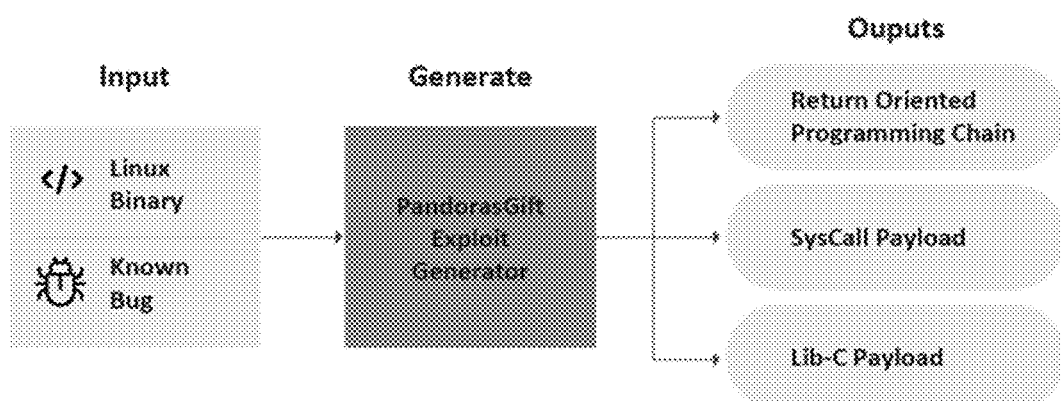
FIG. 12 shows an exemplary process flow for generating an exploit based on a configuration template.

These steps can be improved through automation via automatically gathering updates, looking for signatures in the vulnerable code, regenerating offsets, Return Oriented Programming chains, etc. Return Oriented Programming (ROP) can refer to chaining together small snippets of assembly to perform a complex action. The small snippets (e.g., ROP gadgets) can perform one simple action before calling return. This can allow for multiple gadgets to be called one after another in a fake call stack. This fake call stack can be referred to as a ROP chain. It can be used to form an exploit payload. An exemplary use of a ROP applied to sentences is illustrated in FIG. 11.

Improved automation can provide for automated patch and exploit signature generation combined with better detection mechanisms. In this example, using a symbolic model can allow the system 100 to understand critical filters between attacker input and vulnerable code. This understanding can be used to patch flawed logic or inject additional code into a binary to mitigate the attack.

Conclusion

Identifying vulnerabilities and developing exploits requires a specific set of advanced skills, expertise, and a significant time investment. Making this challenge even more daunting is the difficulty associated with hiring, training, and/or retaining qualified staff. Leveraging machine automation and artificial intelligence can reduce time, improve scale, and/or create efficiencies of work output, while also lowering the skillset requirement to conduct vulnerability research.

It will be understood that modifications to the embodiments disclosed herein can be made to meet a particular set of design criteria. For instance, any of the components, features, or steps of the system, apparatus, or method can be any suitable number or type of each to meet a particular objective. Therefore, while certain exemplary embodiments of the systems and methods disclosed herein have been discussed and illustrated, it is to be distinctly understood that the invention is not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiments. Thus, the components, features, and/or configurations of the various embodiments can be combined in any manner and such combinations are expressly contemplated and disclosed by this statement It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning, range, and equivalence thereof are intended to be embraced therein. Additionally, the disclosure of a range of values is a disclosure of every numerical value within that range, including the end points.

What is claimed is:

1. A system for automated exploit generation, the system comprising:
   a processor; and
   a memory associated with the processor having instructions stored thereon that when executed will cause the processor to:
   receive input data representative of a target action to establish a target having a potential target vulnerability;
   build a simulated or emulated target environment that includes the established target;
   conduct an analysis method including one or more of a static, a concrete, a dynamic, or a symbolic analysis of one or more exploitation techniques, the analysis method configured to generate one or more artifacts including one or more behavioral signatures of exploit primitives that translate across different and disparate exploitation techniques;
   create a chainable sequence including the one or more artifacts and one or more of an information disclosure, a read, a write, or an execution exploit primitive;
   generate an exploit chain that, when executed by the processor in response to the target action, will transform the target action to a target failure within the simulated or emulated target environment and thereby expose the target vulnerability, the exploit chain including the chainable sequence;
   execute the exploit chain within the simulated or emulated target environment to examine coverage of the exposed target vulnerability; and
   generate an output representative of the exposed target vulnerability.

2. The system of claim 1, wherein:
   the target is of one or more of a software target, a device target, or an operating system target.

3. The system of claim 1, wherein:
   the exploit chain includes a series of events that transforms the target action to the target failure.

4. The system of claim 1, wherein:
   the exploit chain includes one or more of a path constraint, an execution trace, a performance metric, or metadata.

5. The system of claim 4, wherein:
   metadata includes pre-target failure metadata and post-target failure metadata.

6. The system of claim 1, wherein:
   the exploit chain is generated from an exploit primitive.

7. The system of claim 1, wherein:
   the target vulnerability includes one or more of an error vulnerability, a flaw vulnerability, or an undesired behavior vulnerability.

8. The system of claim 1, wherein:
   exposing the target vulnerability includes exposing a proof of the target vulnerability.

9. The system of claim 1, wherein:
   the output representative of the exposed target vulnerability is generated in one or more diversified forms.

10. The system of claim 9, wherein:
    the one or more diversified forms includes exported exploit demonstration script or system executable shellcode.

11. A computer readable medium having instructions thereon that when executed by a processor will cause the processor to:
    receive input data representative of a target action to establish a target having a potential target vulnerability;
    build a simulated or emulated target environment that includes the established target;
    conduct an analysis method including one or more of a static, a concrete, a dynamic, or a symbolic analysis of one or more exploitation techniques, the analysis method configured to generate one or more artifacts including one or more behavioral signatures of exploit primitives that translate across different and disparate exploitation techniques;
    create a chainable sequence including the one or more artifacts and one or more of an information disclosure, a read, a write, or an execution exploit primitive;
    generate an exploit chain that, when executed by a processor in response to the target action, will transform the target action to a target failure within the simulated or emulated target environment and thereby expose the target vulnerability;
    execute the exploit chain within the simulated or emulated target environment to examine coverage of the exposed target vulnerability; and
    generate an output representative of the exposed target vulnerability.

12. The computer readable medium of claim 11, wherein:
    the target is of one or more of a software target, a device target, or an operating system target.

13. The computer readable medium of claim 11, wherein:
    the exploit chain includes a series of events that transforms the target action to the target failure.

14. A method for automated exploit generation, the method comprising:
    receiving input data representative of a target action to establish a target having a potential target vulnerability;
    building a simulated target environment that includes the established target;
    conducting an analysis method including one or more of a static, a concrete, a dynamic, or a symbolic analysis of one or more exploitation techniques, the analysis method configured to generate one or more artifacts including one or more behavioral signatures of exploit primitives that translate across different and disparate exploitation techniques;
    create a chainable sequence including the one or more artifacts and one or more of an information disclosure, a read, a write, or an execution exploit primitive;
    generating an exploit chain that, when executed by a processor in response to the target action, will transform the target action to a target failure within the simulated or emulated target environment and thereby expose the target vulnerability, the exploit chain including the chainable sequence;
    executing the exploit chain within the simulated or emulated target environment to examine coverage of the exposed target vulnerability; and generating an output representative of the exposed target vulnerability.

15. The method of claim 14, wherein:
the target is of one or more of a software target, a device target, or an operating system target.

16. The method of claim 14, wherein:
the exploit chain includes a series of events that transforms the target action to the target failure.

* * * * *